United States Patent [19]
Tuttle

[11] Patent Number: 6,013,949
[45] Date of Patent: Jan. 11, 2000

[54] MINIATURE RADIO FREQUENCY TRANSCEIVER

[75] Inventor: John R. Tuttle, Corrales, N.Mex.

[73] Assignee: Micron Technology, Inc., Boise, Id.

[21] Appl. No.: 08/934,701

[22] Filed: Sep. 22, 1997

Related U.S. Application Data

[63] Continuation of application No. 08/610,236, Mar. 4, 1996, abandoned, which is a continuation of application No. 08/168,909, Dec. 17, 1993, Pat. No. 5,497,140, which is a continuation of application No. 07/928,899, Aug. 12, 1992, abandoned, said application No. 08/610,236, is a continuation-in-part of application No. 08/489,185, Jun. 9, 1995, abandoned, which is a continuation of application No. 08/123,030, Sep. 14, 1993, Pat. No. 5,448,110, which is a continuation-in-part of application No. 07/899,777, Jun. 17, 1992, abandoned.

[51] Int. Cl.[7] .............................. H01L 23/34; H01L 23/02
[52] U.S. Cl. ...................... 257/723; 257/924; 340/825.54
[58] Field of Search .................................. 257/924, 723, 257/724, 787, 679, 700; 342/51, 44, 42; 340/825.32, 825.54

[56] References Cited

U.S. PATENT DOCUMENTS

| | | | |
|---|---|---|---|
| 3,706,094 | 12/1972 | Cole et al. ................................ | 342/44 |
| 3,750,167 | 7/1973 | Gehman et al. ........................ | 342/44 |
| 3,780,368 | 12/1973 | Northeved et al. ..................... | 342/44 |
| 3,832,530 | 8/1974 | Reitbock et al. ....................... | 342/44 |
| 3,849,633 | 11/1974 | Reitbock et al. ....................... | 235/487 |
| 4,484,355 | 11/1984 | Henke et al. ............................ | 455/76 |
| 4,724,427 | 2/1988 | Carroll ................................... | 340/572 |
| 4,746,618 | 5/1988 | Nath et al. ............................... | 437/2 |
| 4,746,830 | 5/1988 | Holland ............................. | 310/313 D |
| 4,756,717 | 7/1988 | Sturgis et al. .......................... | 427/290 |
| 4,777,563 | 10/1988 | Teraoka et al. ......................... | 361/395 |
| 4,783,646 | 11/1988 | Matsuzaki ............................... | 340/572 |
| 4,827,395 | 5/1989 | Anders et al. .......................... | 364/138 |
| 4,854,328 | 8/1989 | Pollack ................................... | 128/736 |
| 4,911,217 | 3/1990 | Dunn et al. .......................... | 152/152.1 |
| 4,918,631 | 4/1990 | Hara et al. .............................. | 364/708 |
| 4,942,327 | 7/1990 | Watanabe et al. .................. | 310/313 R |
| 4,960,983 | 10/1990 | Inoue ..................................... | 235/449 |
| 4,962,415 | 10/1990 | Yamamoto et al. ..................... | 357/74 |
| 5,008,776 | 4/1991 | Queyssac ................................ | 361/392 |
| 5,023,573 | 6/1991 | Adam .................................. | 333/17.2 |
| 5,095,240 | 3/1992 | Nysen et al. ........................ | 310/313 R |
| 5,124,782 | 6/1992 | Hundt et al. ............................ | 257/724 |
| 5,144,314 | 9/1992 | Malmberg et al. ...................... | 342/44 |
| 5,148,504 | 9/1992 | Levi et al. ............................... | 385/14 |
| 5,153,710 | 10/1992 | McCain .................................... | 357/75 |
| 5,214,410 | 5/1993 | Verster ................................... | 340/572 |
| 5,274,221 | 12/1993 | Matsubara ............................ | 235/492 |
| 5,302,954 | 4/1994 | Brooks et al. ........................... | 342/44 |
| 5,313,211 | 5/1994 | Tokuda et al. ........................... | 342/50 |
| 5,317,309 | 5/1994 | Vercellotti et al. ................ | 340/825.54 |
| 5,337,063 | 8/1994 | Takahira ................................ | 343/741 |
| 5,340,968 | 8/1994 | Watanabe et al. ...................... | 235/380 |
| 5,347,263 | 9/1994 | Carroll et al. ..................... | 340/825.54 |
| 5,414,427 | 5/1995 | Gunnarson .............................. | 342/51 |
| 5,448,110 | 9/1995 | Tuttle . | |
| 5,497,140 | 3/1996 | Tuttle ..................................... | 342/51 |
| 5,572,226 | 11/1996 | Tuttle ..................................... | 343/726 |
| 5,719,586 | 2/1998 | Tuttle et al. . | |
| 5,776,278 | 7/1998 | Tuttle et al. ............................ | 156/213 |
| 5,779,839 | 7/1998 | Tuttle et al. . | |

FOREIGN PATENT DOCUMENTS

| | | | |
|---|---|---|---|
| 41 20 265 | 1/1992 | Germany ....................... | G06K 19/07 |
| 1-191082 | 8/1989 | Japan . | |
| 2-36476 | 3/1990 | Japan . | |
| 2-179794 | 7/1990 | Japan . | |
| 3-224799 | 10/1991 | Japan . | |
| 4-359183 | 11/1992 | Japan . | |
| 1567784 | 5/1980 | United Kingdom .......... | G06K 19/00 |

OTHER PUBLICATIONS

K. Casson et al., "High Temperature Packaging: Flip Chip on Flexible Laminate", Jan. 1992, Surface Mount Technology, pp. 19–20.

R.W. Johnson, "Polymer Thick Films: Technology and Materials", Jul. 1982, Circuits Manufacturing (reprint).

K. Gilleo, "Using SM Devices On Flexible Circuitry", Mar. 1986, Electri–onics, pp. 20–23.

M. G. Kanatzibis, "Conductive Polymers", Dec. 3, 1990, Chemical and Engineering News—American Chemical Society, pp. 36–54.

*Primary Examiner*—Sheila V. Clark
*Attorney, Agent, or Firm*—William J. Bethurum; Robert J.

Stern

[57] ABSTRACT

The present application describes an electronically powered postage stamp or mailing label and including a radio frequency identification (RFID) device and system mounted between the opposing and facing major surfaces thereof. The RFID device and system includes an integrated circuit transceiver chip which is connected to and powered by a thin flat battery cell and is operated with a thin film RF antenna, all of which are mounted in side-by-side relationship on a thin base or support layer. These thin flat components are mounted in an essentially two dimensional planar configuration well suited for incorporation into the planar structure of a postage stamp or a mailing label. In addition, the RFID transceiver chip may be replaced with an electro-optically operated IC chip using, for example, LEDs or laser diodes for the propagation of light signals to an interrogator.

23 Claims, 6 Drawing Sheets

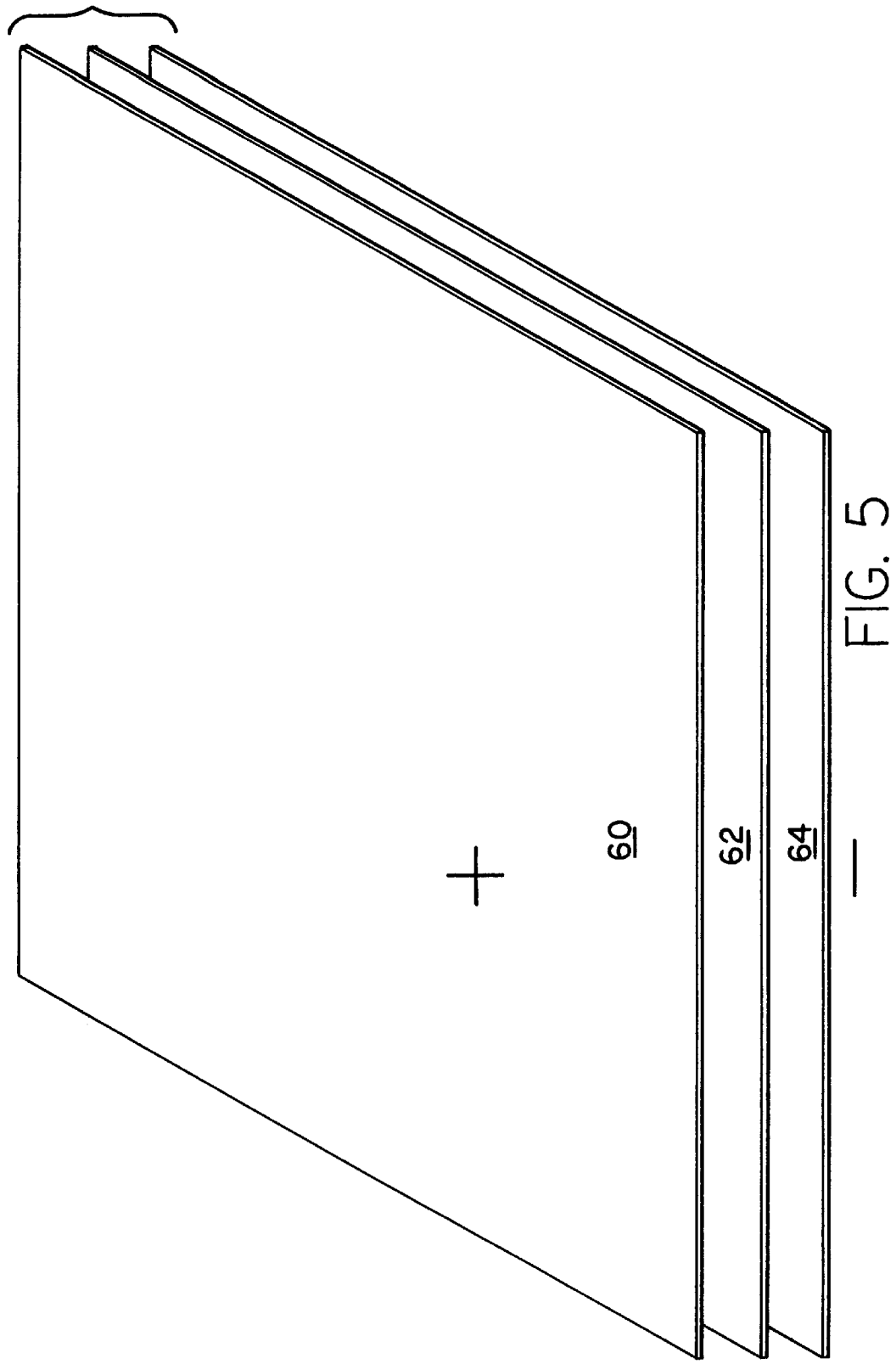

MINIATURE RADIO FREQUENCY TRANSCEIVER

This application is a continuation of application Ser. No. 08/610,236 filed Mar. 4, 1996, now abandoned, which is a continuation of application Ser. No. 08/168,909 filed Dec. 17, 1993, to issue as U.S. Pat. No. 5,497,140, which is a continuation of application Ser. No. 07/928,899 filed Aug. 12, 1992, now abandoned. Application Ser. No. 08/610,236 is a continuation-in-part of application Ser. No. 08/489,185 filed Jun. 9, 1995, now abandoned, which is a continuation of application Ser. No. 08/123,030 filed Sep. 14, 1993, now U.S. Pat. No. 5,448,110, which is a continuation-in-part of application Ser. No. 07/899,777 filed Jun. 17, 1992, now abandoned.

TECHNICAL FIELD

This invention relates generally to electrically powered postage stamps and mailing labels which operate to transmit radio frequency (RF) identification signals to an interrogator either at the point of shipment origin, in transit, or upon reaching a point of destination. More particularly, this invention relates to such stamps and labels having an integrated circuit therein powered by a thin flat battery cell.

RELATED APPLICATION AND BACKGROUND ART

In my co-pending application Ser. No. (71-579) entitled "Radio Frequency Identification Device and Method of Manufacture, Including an Electrical Operating System and Method", filed Jun. 17, 1992, there are disclosed and claimed new and improved radio frequency identification (RFID) tags which may be affixed to various articles (or persons) so that these articles, when shipped, may be easily tracked from the point of shipment origin, then along a given route, and then readily located upon reaching a point of destination. These RFID tags are constructed within a small area on the order of one inch (1") square or less and of a thickness on the order of 30 mils. These tags include, among other things, an integrated circuit (IC) chip having transmitter, receiver, memory and control logic sections therein which together form an IC transceiver capable of being powered by either a small battery or by a capacitor charged from a remote RF source. The IC chip including the RF transmitter and receiver sections operates to provide for the RF signal transmission and reception to and from remote sources, and a thin film antenna is also constructed within the above small area. The above novel RFID system operates to receive, store, and transmit article-identifying data to and from the memory within the IC chip. This data is stored within the IC chip memory stage and may be subsequently called up and transmitted to an interrogating party at the above point of origin, points along a given shipment route, and then upon reaching a point of destination. This co-pending application is assigned to the present assignee and is incorporated herein by reference.

The RFID device disclosed and claimed in my above identified co-pending application represents not only a fundamental breakthrough in the field of RF identification generally, but also represents significant specific advances over the prior art described in some detail in this co-pending application. This prior art includes relatively large hybrid electronic packages which have been affixed to railroad cars to reflect RF signals in order to monitor the location and movement of such cars. This prior art also includes smaller passive RFID packages which have been developed in the field of transportation and are operative for tracking automobiles. These reflective passive RFID packages operate by modulating the impedance of an antenna, but are generally inefficient in operation, require large amounts of power to operate, and have a limited data handling capability.

The above mentioned prior art still further includes bar code identification devices and optical character recognition (OCR) devices which are well known in the art. However, these bar code identification and OCR devices require labor intensive operation and tend to be not only very expensive, but highly unreliable. However, all of the above mentioned prior art devices described in my above co-pending application are only remotely related to the present invention as will become more readily apparent in the following description thereof.

SUMMARY OF INVENTION

The general purpose and principal object of the present invention is to provide still further new and useful improvements in the field of radio frequency identification (RFID) generally and improvements which are particularly adapted and well-suited for operation with electrically powered postage stamps and mailing labels. These new and useful improvements are made both with respect to the novel devices and processes described and claimed in my above identified co-pending application, and also with respect to all of the prior art described therein.

To accomplish the above purpose and object, there have been developed both an electrically powered postage stamp and an electrically powered mailing label, each of which include, in combination, an integrated circuit chip having an RF transceiver constructed therein; a thin flat battery cell connected to the IC chip for providing power thereto; and a thin film RF antenna connected to the IC chip for transmitting data to and from the IC chip. All of the above components are connected in a very thin array and mounted between opposing major facing surfaces of either a postage stamp or a larger mailing or shipping label in a substantially two dimensional planar configuration. These components are operative to store data in the IC chip memory, which data includes such things as the destination address, return address, and descriptions of the contents of the article being mailed or shipped. These components are further operative in a novel system combination to transmit the stored data to an interrogating party upon receipt of RF interrogation signals transmitted to the stamp or label, or to receive data from same.

Accordingly, it is another object of this invention to provide a new and improved RFID stamp or label of the type described which is uniquely constructed in an essentially two dimensional configuration which is easily scalable to the two dimensional major surface area of either a postage stamp or a mailing label.

Another object of this invention is to provide a new and improved electronically powered stamp or label of the type described and process for making the stamp or label which employs certain novel, thin film fabrication techniques capable of producing device thicknesses on the order of a fraction of a millimeter. These thicknesses are typically within the range of one to five mils, thereby being extremely well suited and adapted for use with corresponding postage stamp or mailing label thickness dimensions.

A further object of this invention is to provide a new and improved electronically powered postage stamp or mailing label of the type described including RFID integrated circuitry which is operatively powered by a flat and very thin battery and imparts a high and sophisticated degree of RF communication capability to these stamps or labels without significantly increasing the overall size and volume of the stamps or labels.

The above brief summary of the invention, together with its various objects, novel features and attendant advantages, will become more readily apparent in the following description of the accompanying drawings.

BRIEF DESCRIPTION OF THE DRAWINGS

FIG. 5 is a greatly enlarged perspective view of one suitable, very thin lithium/vanadium-oxide/copper battery or cell useful in the label and stamp embodiments and perspective views shown in FIGS. 1 and 2 above.

DETAILED DESCRIPTION OF THE PREFERRED EMBODIMENT

Figure 1:
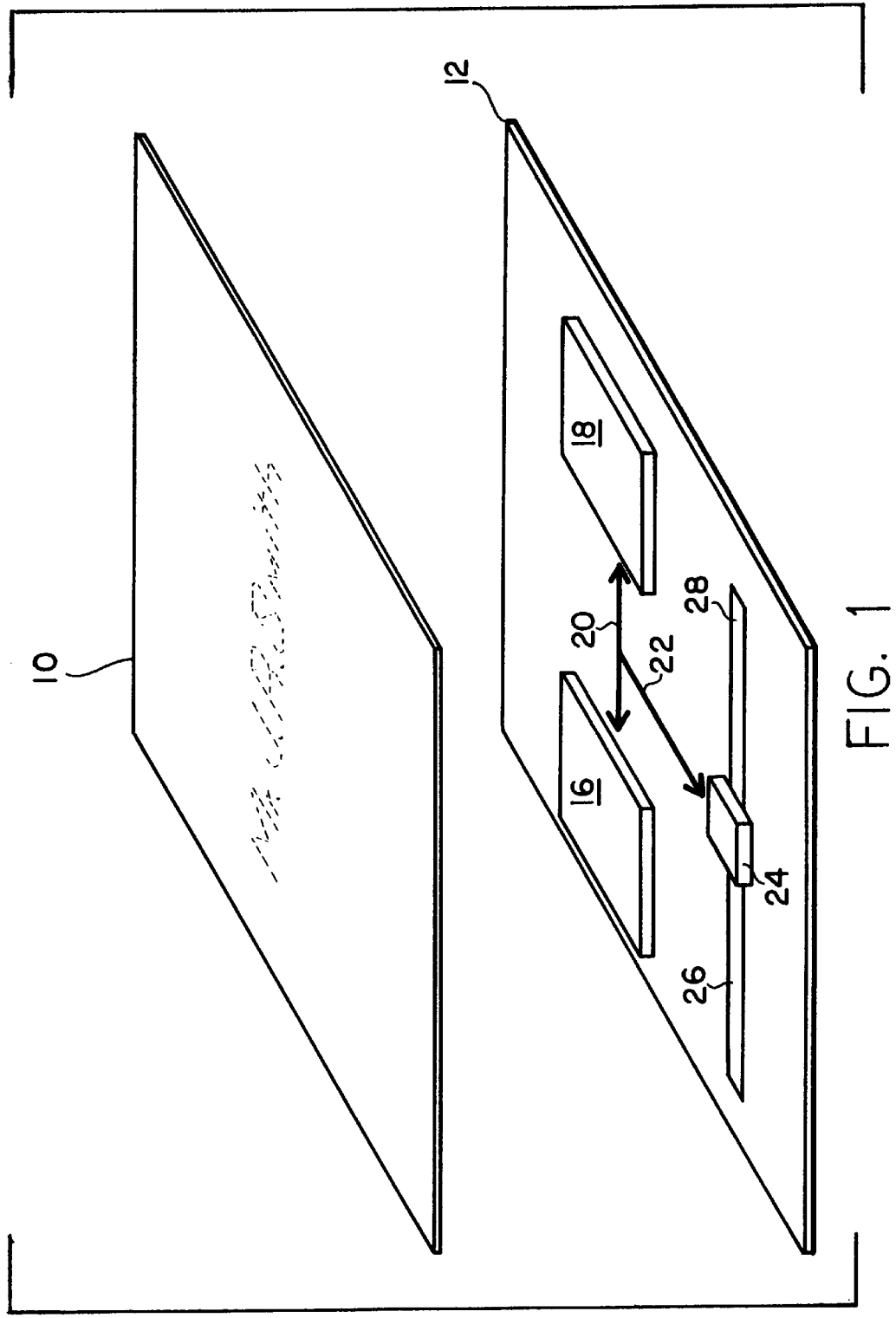
FIG. 1 is an exploded perspective view of the electrically powered mailing or shipping label embodiment of the invention, including the novel radio frequency identification system mounted on the label base member. However, it should be understood that there is no basic functional difference in the label and stamp embodiments of the invention, and that the label cover and label base members shown in FIG. 1 apply equally as well to the smaller stamp cover or stamp base members which, for sake of brevity, have not been shown in the drawings.

Referring now to FIG. 1, the electrically powered, RF operative label or stamp includes a cover member 10 and a base member 12 upon which a radio frequency identification system has been constructed using thin film deposition techniques of the type described in my above identified co-pending application Ser. No. (71-579) filed Jun. 17, 1992. Functionally speaking, the RFID system 14 will include one or more thin flat battery cells 16 and 18 which are connected in series as indicated by line 20 and are both connected via line 22 to drive an integrated circuit transceiver chip 24. The IC transceiver chip 24 will preferably be connected to a dipole antenna consisting of thin film antenna strips 26 and 28, and the dipole antenna 26 and 28 is operative to both transmit RF signals from the IC chip 24 to a controller and to receive incoming RF signals from an external RF source controller and operative to encode this data in IC chip memory in a manner more particularly described below with reference to FIG. 6. This data will typically include information on the article to which the label or stamp are affixed, such as an identification number, the sender's name, point of origin, weight, size, route, destination, and the like. In addition, the RFID system 14 may be used to automatically RF communicate with postage meters and with automatic sorting machines to thereby completely eliminate the need for human intervention for such automatic sorting, thereby greatly reducing automatic mail sorting costs while simultaneously greatly increasing the speed and accuracy of the mail sorting process.

The thin flat battery cells 16 and 18 can be made of various materials and typically include an anode, a collector, a cathode material, and a battery separator including a polymer and electrolytes of the type described below so as to not exceed a total battery thickness of 1 to 10 mils, while simultaneously being flexible and in some cases rechargeable. Furthermore, imminent commercialization of solid thin flat batteries having useful current levels at low temperatures makes the present invention commercially viable. Thus, since the IC chip 24 can also be made of thicknesses of no greater than 8 mils and since the thin film metal dipole antenna strips 26 and 28 may be held to thicknesses less than 1 to 2 mils, it is seen that the total added thickness between the label cover and base layers 10 and 12 will be negligible and not significantly affecting the bulk or the volume of the stamp or label into which the RFID system 14 is incorporated.

Figure 2:
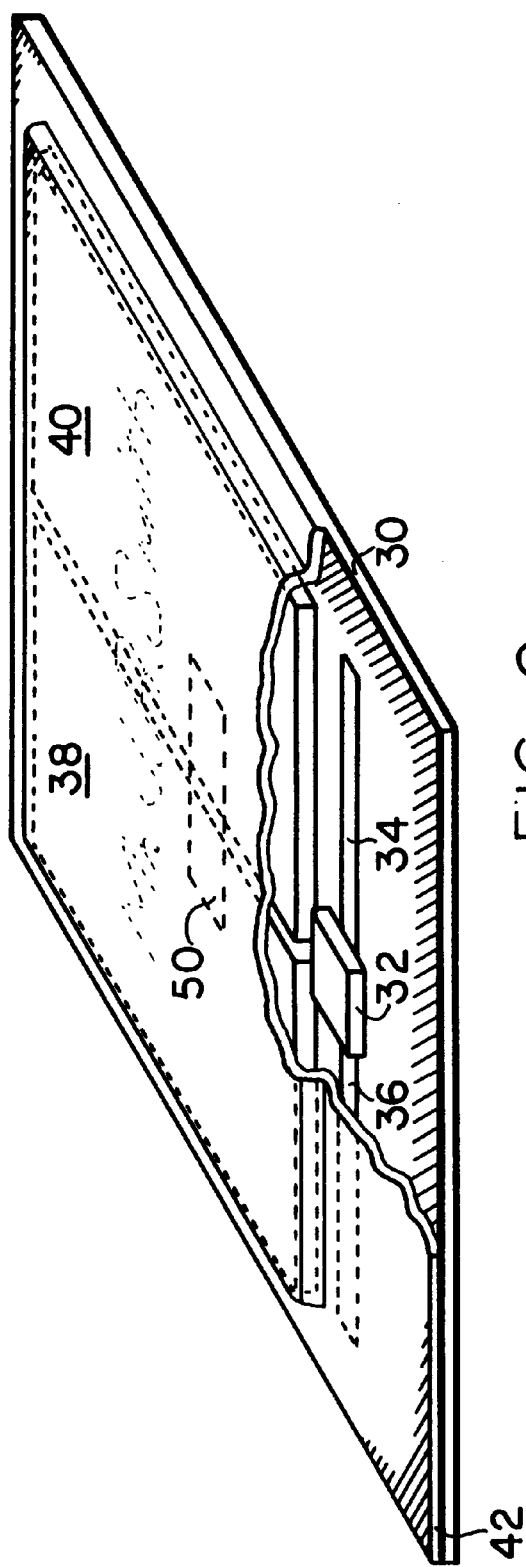
FIG. 2 is an enlarged perspective view of an RFID device and label or stamp package constructed in accordance with a preferred embodiment of the present invention.

Referring now to FIG. 2, there is shown in a perspective view a preferred device embodiment of the present invention wherein the RFID tag includes a base support layer 30 upon which an integrated circuit chip 32 is disposed on the near end of the layer 30 and connected to a dipole antenna consisting of a pair of conductive strips 34 and 36 extending laterally from the chip 32. These conductive strips 34 and 36 will typically be screen printed on the upper surface of the base support layer 30.

A pair of rectangularly shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the folding over of an outer or upper cover member 42 which is sealed to the exposed edge surface portions of the base member 30 to thereby provide an hermetically sealed and completed package. When the cover member 42 is folded over on the base member, the contact 50 which is attached to batteries 38 and 40 using conductive epoxy, provides the back side series electrical connection for the two batteries 38 and 40. The integrated circuit chip 32 has transmitter, memory, control, logic, and receiver stages therein and is powered by the two batteries 38 and 40 during the transmission and reception of data to and from an interrogator to provide the interrogator with the various above information and identification parameters concerning the article, animal or person to which the RFID tag is attached.

Figure 3:
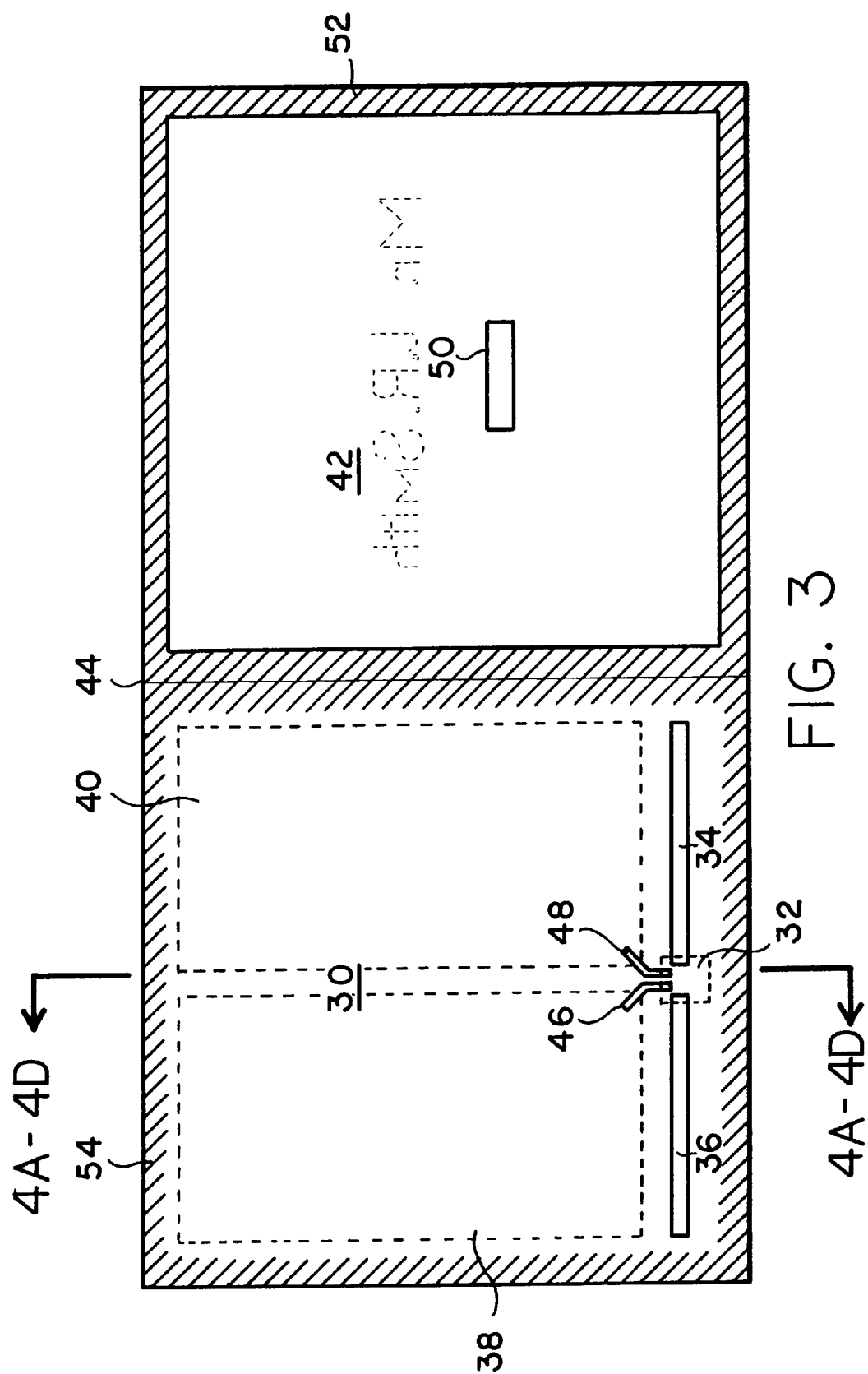
FIG. 3 is a plan view showing the conductive patterns on the base and cover members used in FIG. 2, including dotted line outlines for the locations of the IC chip and batteries which form the FIG. 2 structure.

Referring now to FIG. 3, there is shown a plan view of the geometry of the base support member 30 and the cover member 42 which, during the initial manufacturing stage for the RFID device, are joined at an intersecting line 44. The dipole antenna strips 34 and 36 are shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180° at intersecting line 44, its outer boundary 52 is ready to be sealed with the outer boundary 54 of the base support member 30.

Simultaneously, the conductive strip 50 bonded by the conductive epoxy to the batteries 38 and 40, completes the series electrical connection used to connect the two batteries 38 and 40 in series with each other and further in the series circuit with the integrated circuit chip 32 through the two conductors 46 and 48.

Figure 4A:
FIGS. 4A through 4D are cross sectional views taken along lines 4—4 of FIG. 3 showing the four (4) major processing steps which are used in constructing the RFID device and system array in accordance with a preferred process embodiment of the invention.

Referring now to FIGS. 4A through 4D taken at the 4A—4D cross section indicated in FIG. 3, FIG. 4A shows in cross section view the IC chip 32 bonded to the base support member 30 by means of a spot or button of conductive epoxy material 56. The conductive strip 48 is shown in cross section on the upper surface of the base support member 30.

Figure 4B:

Referring now to FIG. 4B, the battery 40 is aligned in place as indicated earlier in FIG. 2 and has the right hand end thereof bonded and connected to the upper surface of the conductive strip 48 by means of a spot of conductive epoxy applied to the upper surface of the conductive strip 48, but not numbered in this figure.

Figure 4C:
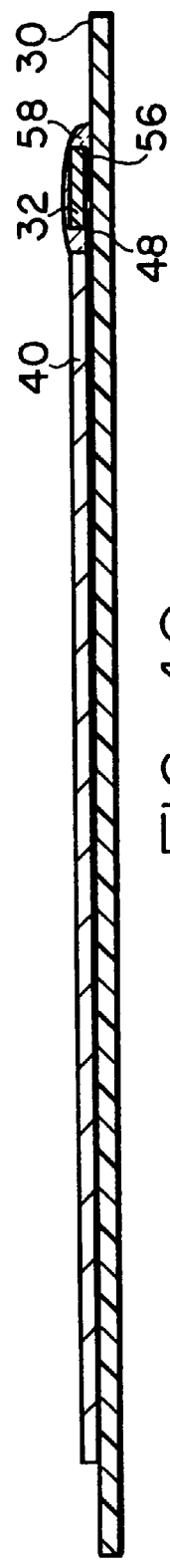

Referring now to FIG. 4C, a stiffener material 58 is applied as shown over the upper and side surfaces of the IC chip 32, and the stiffener material will preferably be an insulating material such as "glob-top" epoxy to provide a desired degree of stiffness to the package and protection for the integrated circuit as completed.

Figure 4D:
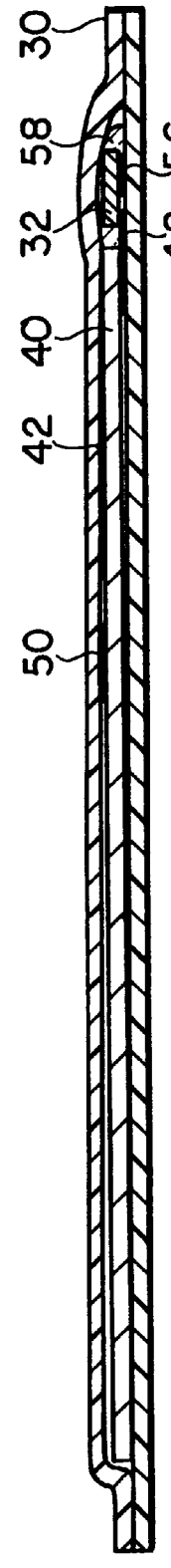

Next, a spot of conductive epoxy is applied to each end of the conductive strip 50, and then the cover layer material 42 with the conductive epoxy thereon is folded over onto the batteries 38 (of FIG. 2) and 40 and the base member 30 to cure and heat seal and thus complete and seal the package in the configuration shown in FIG. 4D. This figure corresponds to the remaining stations 22, 24, and 26 in FIG. 1.

Referring now to FIG. 5, there is shown in a greatly enlarged perspective view a lithium/vanadium-oxide/copper battery including a lithium anode 60 as a top plate for the battery, an intermediate polymerized vanadium oxide electrolyte and separator layer 62 and a copper collector 64. However, the layer 62 is not limited to the use of vanadium oxide ($V_2O_5$ or $V_6O_{13}$), but may use other oxides such as magnesium oxide, $MnO_2$. The intermediate layer 62 is formed and polymerized on the upper surface of the copper collector 64 and may be obtained from outside manufacturers or vendors as a one piece sheet (62, 64) and then assembled in house with lithium top anode sheets. Alternatively, the thin flat battery structure shown in FIG. 5 may be obtained as a completed battery cell from outside vendors or manufacturers. The thickness of these thin flat batteries will typically be in the range of 1 to 10 mils, and as previously indicated may be made as thin as a fraction of a mil. The components are assembled in an argon or other inert dry atmosphere using state of the art thin dry cell fabrication techniques. The use of conductive polymer layers as separators in thin flat battery cells is generally known in the art and is described, for example, in an article by M. G. Kanatzibis entitled "Conductive Polymers", *Chemical and Engineering News-American Chemical Society*, Dec. 3, 1990, incorporated herein by reference.

Figure 6:
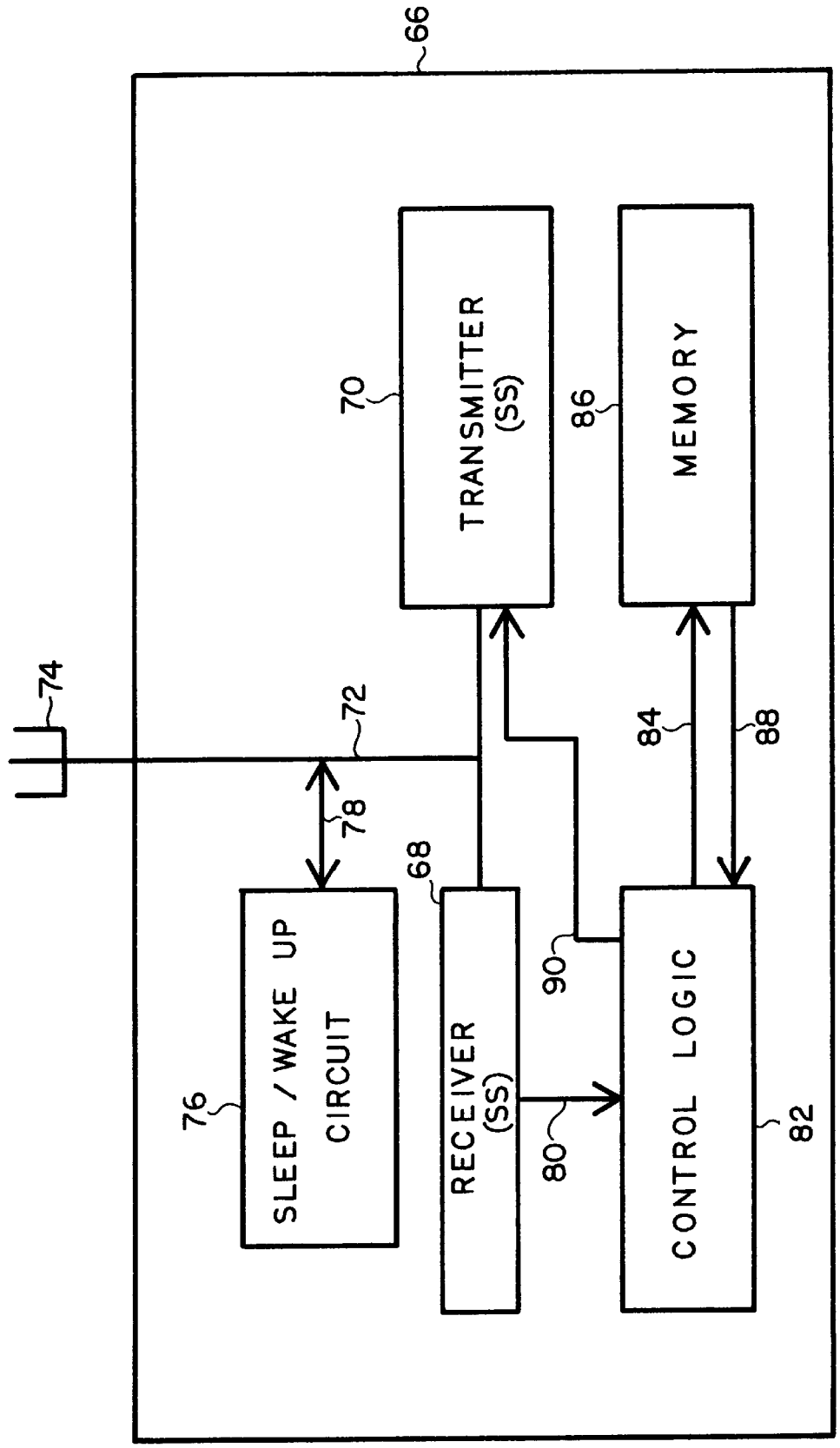
FIG. 6 is a functional block diagram showing the major signal processing stages within the RFID integrated circuit chip described herein and shown in FIGS. 1 and 2 above. These major signal processing stages are also used within the interrogation unit (not shown) which is operative to interrogate the IC chip shown in FIGS. 1 and 2 above.

Referring now to FIG. 6, the rectangular outer boundary 66 in this figure defines the active area on the integrated circuit chip (e.g. 24 in FIG. 1) in which the novel integrated circuit transceiver has been formed using state of the art MOS planar processing techniques. These MOS planar processing techniques are well known in the art and are, therefore, not described in detail herein. Within the chip active area 66 there is provided an RF receiver stage 68 and an RF transmitter stage 70, both connected through a common line or connection 72 to an off-chip antenna 74 of any planar type. A sleep/wake up circuit 76 is also connected via line 78 to the antenna 74 and operates in response to signals received from the antenna 74 to activate the necessary remaining circuitry and stages on the IC chip 66 described below.

The receiver 68 is connected through a line 80 to a control logic stage 82, and a first output line 84 from the control logic stage 82 is connected as an input to the memory stage 86. A return output line 88 from the memory stage 86 connects back to the control logic stage 82, and a second output line 90 from the control logic stage 82 connects as a second input to the transmitter 70 for providing memory or stored input data to the transmitter 70 via the control logic stage 82. In a data encoding operation, the data received concerning ID number, name, route, destination, size, weight, etc. is processed through the receiver 68 and through the control logic stage 82 and encoded into the memory stage 86.

As an example of a data call-up operation, when the RFID package in the above figures is placed on the outside surface of a piece luggage by the airlines or on a package for shipment by the postal service, either the airline agent or the postal worker will transmit information to the receiver 68 via an RF communication link concerning data such as the owner's name ID number, point of origin, weight, size, route, destination, and the like. This information received at the receiver stage 68 is then transmitted over line 80 and through the appropriate control logic stage 82 which sorts this information out in a known manner and in turn transmits the data to be stored via lines 84 into a bank of memory 86. This data is stored here in memory 86 until such time that it is desired to call up the data at one or more points along the shipment route.

For example, upon reaching a point of shipment destination, an interrogator may want to call up this data and use it at the point of destination for insuring that the item of shipment or luggage is most ensuredly and efficiently put in the hands of the desired recipient at the earliest possible time. Thus, an interrogator at the destination point will send interrogation signals to the RFID chip 66 where they will be received at the antenna 74 and first processed by a sleep/wake up circuit 76 which operates to bring the FIG. 6 circuitry out of the sleep mode and allow the receiver stage 68 to process this received data to the control logic stage 82 via line 80. At the same time, the requestor will be operating an interrogation electronic unit having therein the same circuitry as that shown in FIG. 6, less the sleep/wake up circuit 76.

With all stages in the FIG. 6 circuitry now awake, the memory stage 86 will produce the above six pieces of information relating to the shipped article and generate this data on line 88 and back through the control logic stage 82 into the transmitter 70 so that the transmitter 70 can now transmit this data to the interrogator.

The receiver and transmitter sections 68 and 70 in FIG. 6 will preferably be operated in one of the well known spread spectrum (SS) modes using one of several available SS types of modulation which include: (1) direct sequence, (2) frequency hopping, (3) pulsed FM or chirped modulation, (4) time hopping, or time-frequency hopping used with pulse amplitude modulation, simple pulsed amplitude modulation or binary phase shift keying. The spread spectrum mode of operation per se is generally well known in the art and must conform to the frequency band separation requirements of the FCC Regulations, Part 15, incorporated herein by reference. The circuitry for the interrogation unit (not shown)

will be similar to the functional system shown in FIG. 6 as will be understood by those skilled in the art, and therefore the interrogation unit will not be described herein.

Various modifications may be made in and to the above described embodiment without departing from the spirit and scope of this invention. For example, various modifications and changes may be made in the antenna configurations, battery arrangements (such as battery stacking), device materials, device fabrication steps, and the system block diagram in FIG. 6 without departing from the scope of this invention. In addition, the various off chip components such as the antenna, battery, capacitor, and even inductors can be manufactured on-chip within the claims herein. In the case where RF charging is used, a battery will not be required. Accordingly, these and other constructional modifications are within the scope of the following appended claims.

In addition, still other modifications may be made in and to the above described cell fabrication and device fabrication procedures without departing from the spirit and scope of this invention. For example, the present invention is not limited to the use of any particular types of thin flat battery cells or materials or cell fabrication processes, nor is it limited to the particular preferred fabrication technique for the RFID system as shown in FIGS. 2, 3, and 4 above. Moreover, the present invention is not strictly limited to the use of radio frequency communication and may, in environments where RF signals are not allowed, be modified so that the IC chip transceiver is capable of communicating with light waves using certain state of the art electro-optical coupling techniques which are not described herein, but are clearly within the scope of the following appended claims.

Finally, it will be understood and appreciated by those skilled in the art that the present invention also includes forming an optical detector on the IC chip as a means of receiving and detecting signals carried by light and also as a means of powering the RFID transceiver as an alternative to using a battery. Accordingly, these and other systems and constructional modifications are clearly within the scope of the broad claims filed herein.

I claim:

1. A miniature radio frequency transceiver, comprising:
   (a) a thin sheet bounded by first and second outer surfaces;
   (b) a thin, flat battery bounded by first and second planar electrodes, the first electrode being mounted on and bonded directly to the first surface of the sheet;
   (c) an integrated circuit including a radio frequency identification transceiver circuit, the integrated circuit being mounted on and bonded directly to the first surface of the sheet;
   (d) a first thin, conductive strip on the first surface of the sheet, the strip being shaped so as to function as a radio frequency antenna, the strip being connected to the integrated circuit by electrically conductive adhesive; and
   (e) a second thin, conductive strip on the first surface of the sheet, the strip having one end connected to the battery and an opposite end connected to the integrated circuit, both connections being secured by electrically conductive adhesive;
   (f) a cover bonded directly to the sheet at a mutual periphery so that the cover and the sheet sealingly enclose the battery and the integrated circuit;
   (g) wherein the sheet and the cover each have a thickness not substantially greater than either the thickness of the battery or the thickness of the integrated circuit;
   (h) whereby the transceiver is extremely thin.

2. A miniature radio frequency transceiver, comprising:
   (a) first and second covers, each cover being a thin sheet, the two covers being bonded directly together at a mutual periphery so as to sealingly enclose a thin, planar cavity;
   (b) a thin, flat battery located within the cavity, the battery being bounded by first and second planar electrical terminals, the first and second terminals being bonded directly to the first and second covers, respectively;
   (c) an integrated circuit including a radio frequency identification transceiver circuit, wherein the integrated circuit is located within the cavity and is bonded directly to the first and second covers;
   (d) a first thin, conductive strip on the interior surface of at least one of the covers, the strip being shaped so as to function as a radio frequency antenna, the strip being connected to the integrated circuit by electrically conductive adhesive; and
   (e) a second thin, conductive strip on the interior surface of at least one of the covers, the strip having one end connected to the battery and an opposite end connected to the integrated circuit, both connections being secured by electrically conductive adhesive;
   (f) wherein each of the two covers has a thickness not substantially greater than either the thickness of the battery or the thickness of the integrated circuit;
   (g) whereby the transceiver is extremely thin.

3. A transceiver according to claim 2, wherein the electrically conductive adhesive is electrically conductive epoxy.

4. A transceiver according to claim 2, wherein
   the first and second battery terminals are composed of a lithium sheet and a copper sheet, respectively; and
   a polymerized electrolyte fills a volume separating the two battery terminals.

5. A miniature radio frequency transceiver, comprising:
   (a) upper and lower covers, each cover being a thin sheet, the two covers being bonded directly together at a mutual periphery so as to sealingly enclose a thin, planar cavity;
   (b) an integrated circuit including a radio frequency transceiver circuit, wherein the integrated circuit is located within the cavity and is bonded directly to at least one of the covers;
   (c) first and second thin, flat batteries located within the cavity, each battery being bounded by a planar upper surface and a planar lower surface bonded directly to the upper and lower covers, respectively, wherein the upper and lower surfaces of each battery include an upper battery electrical terminal and a lower battery electrical terminal, respectively;
   (d) a first thin, conductive strip on the interior surface of the lower cover, the first strip having one end connected to the lower terminal of the first battery and an opposite end connected to the integrated circuit;
   (e) a second thin, conductive strip on the interior surface of the lower cover, the second strip extending between one portion connected to the lower terminal of the second battery and another portion connected to the integrated circuit; and
   (f) a third thin, conductive strip on the interior surface of the upper cover, the third strip having one end connected to the upper terminal of the first battery and an opposite end connected to the upper terminal of the second battery;

(g) wherein the upper and lower terminals of one battery are negative and positive, respectively, and wherein the upper and lower terminals of the other battery are positive and negative, respectively;

(h) whereby the third strip connects the two batteries in series, and whereby the first and second strips permit the integrated circuit to connect to both positive and negative battery terminals from below the integrated circuit.

6. A transceiver according to claim 5, further comprising:
a fourth thin, conductive strip on the interior surface of at least one of the covers, the fourth strip being shaped so as to function as a radio frequency antenna, wherein the fourth strip is connected to the integrated circuit.

7. A transceiver according to claim 5, wherein at least one of the conductive strips is connected to an RF section of the transceiver so as to function as an antenna.

8. A miniature radio frequency transceiver, comprising:
a first thin sheet;
a first thin, conductive strip mounted on the first sheet so as to directly overlie the first sheet;
a thin, flat battery having an electrical terminal which is mounted on and bonded directly to a first area of the first conductive strip;
an integrated circuit having a number of electrical terminals and including a radio frequency transceiver circuit, wherein one of the integrated circuit terminals is mounted on and bonded directly to a second area of the first conductive strip so that the first conductive strip electrically connects the integrated circuit to the battery; and
a thin cover bonded directly to the first sheet at a mutual periphery so that the cover and the first sheet sealingly enclose the battery and the integrated circuit;
wherein the first sheet and the cover each have a thickness not substantially greater than the thickness of the battery.

9. A transceiver according to claim 8, wherein the first sheet is a polymer film.

10. A transceiver according to claim 8, further comprising:
a second thin, conductive strip mounted directly on the first sheet so as to directly overlie the first sheet, wherein the strip is shaped so as to function as a radio frequency antenna, and wherein an area of the second strip is bonded directly to one of the terminals of the integrated circuit.

11. A transceiver according to claim 10, wherein the respective areas of the first and second strips which are bonded to the battery and the integrated circuit, respectively, are bonded by electrically conductive adhesive.

12. A transceiver according to claim 8, wherein:
the cover is a second thin sheet; and
the first and second thin sheets are bonded together at a mutual periphery so as to sealingly enclose a thin volume which includes the battery and the integrated circuit, wherein each sheet has a surface facing the thin volume.

13. A transceiver according to claim 12, wherein each sheet is a polymer film.

14. A miniature electrical circuit, comprising:
first and second thin sheets bonded directly together at a mutual periphery so as to sealingly enclose a thin volume, wherein each sheet has a surface facing the thin volume;
a first thin, conductive strip mounted on the first sheet so as to directly overlie said surface of the first sheet; and
first and second thin, flat batteries located within the thin volume between the upper and lower sheets, wherein each battery is bounded by first and second planar electrical terminals,
the first and second terminals of the first battery are negative and positive, respectively,
the first and second terminals of the second battery are positive and negative, respectively, and
the first terminal of each battery is bonded directly to the first conductive strip so that the first conductive strip electrically connects the two batteries in series.

15. A circuit according to claim 14, wherein;
the integrated circuit includes a radio frequency transceiver circuit.

16. A circuit according to claim 15, further comprising:
a fourth thin, conductive strip mounted on one of the sheets so as to directly overlie said surface of at least one of the sheets, wherein the fourth strip is shaped so as to function as a radio frequency antenna, and wherein the fourth strip is connected to the integrated circuit.

17. A circuit according to claim 15, wherein at least one of the conductive strips is connected to an RF section of the transceiver so as to function as an antenna.

18. A miniature electrical circuit, comprising:
a first thin sheet;
a first thin, conductive strip mounted on the first sheet so as to directly overlie the first sheet;
a thin, flat battery having an electrical terminal which is mounted on and bonded directly to a first area of the first conductive strip;
an integrated circuit having a number of electrical terminals, wherein one of the integrated circuit terminals is mounted on and bonded directly to a second area of the first conductive strip so that the first conductive strip electrically connects the integrated circuit to the battery; and
a thin cover bonded directly to the first sheet at a mutual periphery so that the cover and the first sheet sealingly enclose the battery and the integrated circuit;
wherein the first sheet and the cover each have a thickness not substantially greater than the thickness of the battery.

19. A circuit according to claim 18, wherein the first sheet is a polymer film.

20. A circuit according to claim 18, wherein:
the cover is a second thin sheet; and
the first and second thin sheets are bonded together at a mutual periphery so as to sealingly enclose a thin volume which includes the battery and the integrated circuit, wherein each sheet has a surface facing the thin volume.

21. A circuit according to claim 20, wherein each sheet is a polymer film.

22. A circuit according to claim 14, further comprising:
an integrated circuit located within the thin volume between the two sheets, wherein the integrated circuit includes first and second electrical terminals;
a second thin, conductive strip mounted on the second sheet so as to directly overlie said surface of the second sheet, wherein one area of the second strip is bonded to the second terminal of the first battery, and another area of the second strip is bonded to the first terminal of the integrated circuit; and a third thin, conductive strip mounted on the second sheet so as to directly overlie said surface of the second sheet, wherein one area of the third strip is bonded to the second terminal of the second battery, and another area of the third strip is bonded to the second terminal of the integrated circuit.

23. A transceiver according to claim 12, further comprising:

a second thin, conductive strip mounted directly on at least one of the two sheets so as to directly overlie said surface of said at least one sheet, wherein the strip is shaped so as to function as a radio frequency antenna, and wherein an area of the second strip is bonded directly to one of the terminals of the integrated circuit.

* * * * *